(12) United States Patent
Phillips

(10) Patent No.: US 6,308,993 B1
(45) Date of Patent: Oct. 30, 2001

(54) TWO PIECE MALE HOSE COUPLING

(75) Inventor: Daniel L. Phillips, Pioneer, OH (US)

(73) Assignee: Winzeler Stamping Company, Montpelier, OH (US)

( * ) Notice: Subject to any disclaimer, the term of this patent is extended or adjusted under 35 U.S.C. 154(b) by 0 days.

(21) Appl. No.: 09/455,192

(22) Filed: Dec. 6, 1999

Related U.S. Application Data

(60) Provisional application No. 60/111,076, filed on Dec. 7, 1998.

(51) Int. Cl.[7] .................................................. F16L 33/00
(52) U.S. Cl. ................................................ 285/256; 285/258
(58) Field of Search ................................... 285/256, 258, 285/259, 289.5, 382; 29/890.144, 505, 512

(56) References Cited

U.S. PATENT DOCUMENTS

| | | | |
|---|---|---|---|
| 2,268,142 | * 12/1941 | Lusher et al. | 285/259 X |
| 2,377,010 | * 5/1945 | Howard | 285/258 X |
| 2,686,066 | * 8/1954 | Paquin | 285/256 X |
| 4,288,110 | * 9/1981 | Grenell | 285/259 X |
| 4,690,435 | * 9/1987 | Manning et al. | 285/256 |
| 4,850,620 | * 7/1989 | Puls | 285/258 X |
| 4,962,582 | 10/1990 | Puls . | |
| 5,141,262 | * 8/1992 | Bartholomew | 29/512 |
| 5,295,718 | * 3/1994 | Bartholomew | 285/258 |
| 5,890,748 | * 4/1999 | Phillips et al. | 285/289.5 |
| 6,219,917 | * 4/2001 | Peed et al. | 29/890.144 |

* cited by examiner

*Primary Examiner*—Lynne H. Browne
*Assistant Examiner*—David E. Bochna
(74) *Attorney, Agent, or Firm*—Donald R. Fraser

(57) ABSTRACT

A composite male hose coupler comprising a metallic tail piece; an externally threaded male fitting; and means for affixing the tail piece to the male fitting; and a method of manufacture thereof, are disclosed. The metallic tail piece is formed of annealed brass tube stack and includes a first cylindrical portion and a second cylindrical portion joined together by a radially outwardly extending flange generally perpendicular to the longitudinal axes of the first and second cylindrical portions. The externally threaded male fitting is formed of machined brass stock and includes external threads on the outer surface and an annular lip for receiving the flange of the tail piece.

3 Claims, 1 Drawing Sheet

TWO PIECE MALE HOSE COUPLING

This is a continuation of provisional patent application Ser. No. 60/111,076, filed Dec. 7, 1998.

FIELD OF THE INVENTION

This invention pertains generally to hose couplers, and more particularly to composite male hose couplers for the ends of flexible, resilient hoses of the so-called garden hose type.

BACKGROUND OF THE INVENTION

Garden hoses made of various forms of rubber and plastic are generally provided with so-called male and female end couplers by which the hoses are connected to one another, to faucets or spigots supplying liquid thereto, and to nozzles, sprinklers, etc. for dispensing the liquid. On currently marketed hoses such couplers, which are permanently affixed to the hose ends during production of the hose assembly, commonly comprise threaded male and female couplers, made of brass or the like, which include a ferrule placed over the outer end of the hose. A cylindrical tail piece, again of brass or the like, is introduced into the hose end and permanently expanded outwardly to urge the hose into liquid-tight engagement with the ferrule.

The male couplers fabricated of strip metal have certain disadvantages. These metallic couplers have been found to be relatively costly to fabricate and assemble. Both the material itself and the forming process are comparatively expensive. In order to economically manufacture the metallic couplers, the couplers have been stamped from annealed brass stock. Such metallic couplers are also susceptible to being permanently deformed or crushed under heavy loads, such as when run over by an automobile tire, and thus made unusable.

Accordingly, it would be desirable to employ the combined benefits of both the cylindrical tail piece formed of brass strip material, for example, for reception within the end of a garden hose; and a threaded fitting formed of machineable stock.

SUMMARY OF THE INVENTION

In accordance with the invention, there is provided a composite male hose coupler comprised of a stamped metallic tail piece to which an externally threaded metallic fitting has been integrally joined. The externally threaded metallic fitting or collar is typically formed of a machineable brass stock having high resistance to compression. The metallic tail piece is typically preferably formed of annealed brass stock by a stamping operation. The resultant assembly comprises a cylindrical collar having threads formed on at least a portion of the outer surface thereof, the threads terminating at one end of the collar, and an annular inwardly opening channel formed at the opposite end of the collar; and a metallic tail piece including a first cylindrical portion and a second cylindrical portion joined to the first portion by a radially outwardly extending annular flange and the second portion terminating in a radially outwardly extending lip, wherein the annular flange is snugly received within the channel of the collar and the lip receives the termination of the threads of the collar.

The composite coupling may be affixed to the hose end by inserting the first cylindrical portion of the metallic tail piece into the end of the hose and placing a ferrule around the outer circumference of the hose end. The cylindrical portion of the tail piece is then expanded in the conventional manner so that the hose is urged into liquid-tight engagement with the ferrule.

BRIEF DESCRIPTION OF THE DRAWINGS

The above as well as other objects and advantages of the invention may be readily understood by one skilled in the art from reading the following detailed description of an embodiment of the invention when considered in the light of the accompanying drawings, in which.

DETAILED DESCRIPTION OF THE PREFERRED EMBODIMENT

Figure 1:
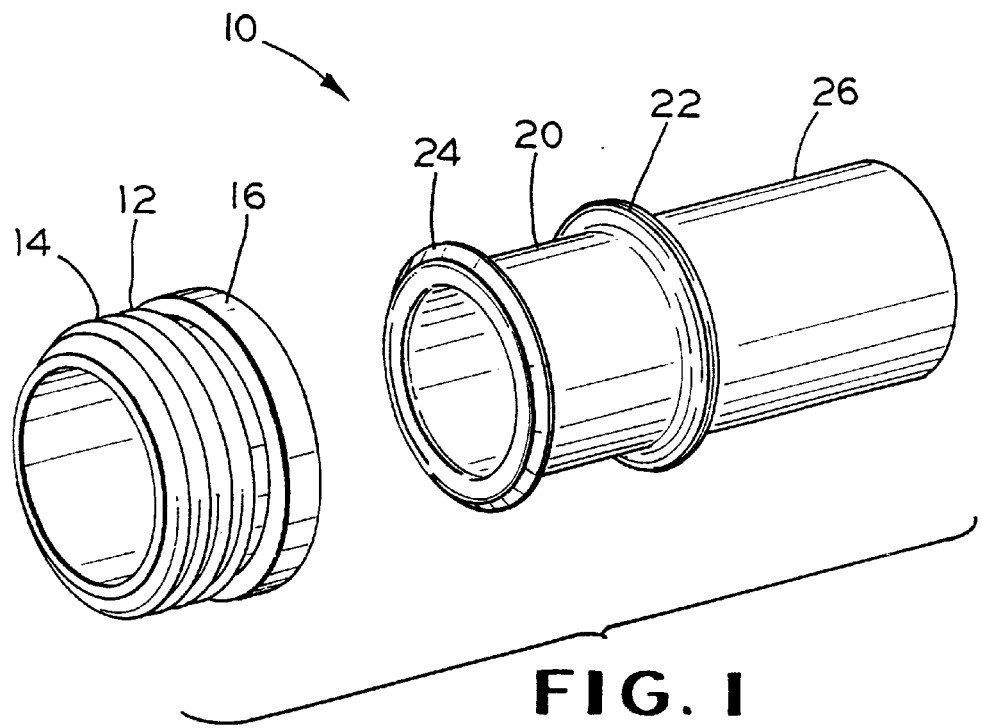
FIG. 1 is an exploded perspective view of a male hose coupling incorporating the features of the invention.

Referring now to the drawings, there is illustrated generally at 10 a composite male hose coupler embodying the features of the present invention.

The hose coupler 10 includes a cylindrical collar 12 having threads 14 formed on a portion of the outer surface thereof. The threads 14 terminate at one end of the collar 12. An annular inwardly opening channel 16 is formed at the opposite end of the collar 12. The collar 12 is typically formed of a machined brass stock.

A hollow cylindrical tail piece 20 is adapted to be press fit within the interior of the collar 12. The tail piece 20 is typically formed of a strip stock and is provided with a radially outwardly extending flange 22 adapted to be press fit within the hollow interior of the channel 16 of the collar 12. The flange 22 is formed intermediate the ends thereof. A radially outwardly extending lip 24 is formed at one end of the tail piece 20. The flange 22 functions to lock the tail piece 20 within the interior of the collar 12. While the rolled over lip 24 cooperates with the flange 22 to locate and maintain the tail piece 20 relative to the collar 12, it also functions to assist in assuring a fluid tight coupling with a female hose coupler (not shown) as well as a nozzle, sprinkler or other fluid dispensing device.

The opposite end portion 26 of the tail piece 20 is adapted to be inserted into the hollow end of a garden hose 30 and is permanently affixed thereto by the combination of the end portion 26 and an outer ferrule 32.

In the assembly process for forming the two piece male hose coupling 10 of the invention, the initial step may include the formation of the tail piece 20 by drawing the same from brass strip stock to the finished dimensions. The part is then washed, annealed and cleaned in any of a number of manners. The tail piece 20 may be formed of CA260 yellow brass strip stock and would be formed to accommodate to any one of a number of different diameter garden hoses.

Next, the threaded collar 12 is formed from brass bar stock to finished dimensions with appropriate thread size. The machined part is then suitably washed. The threaded collar 12 may be formed of CA360 rod brass stock for machinery.

The threaded collar 12 and the tail piece 20 are mechanically joined in a suitable punch press with an indexable table. The process includes the following sequential operations: the two parts are telescopically engaged by pressing them together; then the parts are seated by causing the flange 22 of the tail piece 20 to seat within the channel 16 whereupon the parts are locked relative to one another; and finally the lip 24 is rolled over the terminal outer end of the threaded collar 12.

It will be understood that the male coupling may be used to accommodate a number of different sizes of garden hoses by redimensioning the diameter of the end portion 26 with the use of a common threaded collar 12.

Figure 2:
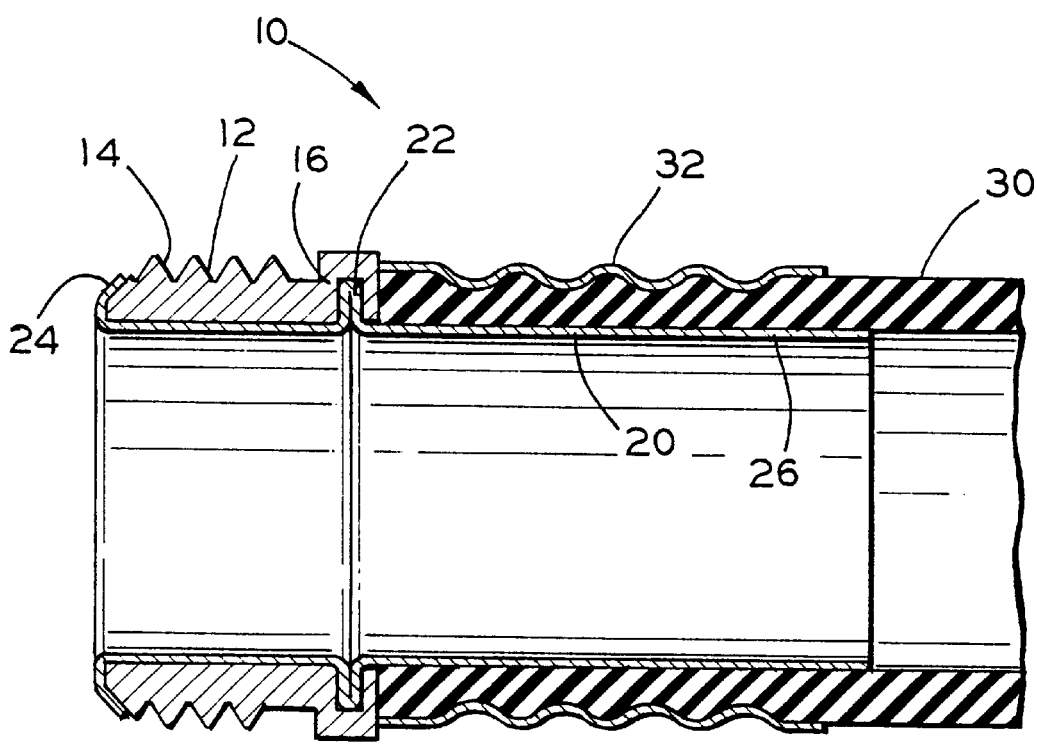
FIG. 2 is a sectional view of the coupling illustrated in FIG. 1 and an associated garden hose.

Also, when the completed assembly, of the collar 12 and the tail piece 20, is coupled to a garden hose 30, the tail piece 20 is received within the hollow interior of an end of the garden hose. The garden hose 30, in the region of the tail piece 20, is surrounded by a ferrule 32. In order to accomplish a fluid tight fit between the tail piece 20 and the hose 30, the ferrule 32 is compressed as typically illustrated in FIG. 2.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A composite male hose coupler comprising:
   a cylindrical collar having threads formed on at lease a portion of the outer surface thereof, the threads terminating at one end of said collar, and an annular inwardly opening channel formed at the opposite end of said collar, the annular inwardly opening channel is generally U-shaped in cross-section; and
   a metallic tail piece including a first cylindrical portion and a second cylindrical portion joined to the portion by a radially outwardly extending flange and the second portion terminating in a radially outwardly extending lip, wherein the annular flange is snugly received with the channel of said collar and the lip receives the termination of the threads of said collar.

2. A composite male hose coupler as defined in claim 1 wherein the annular inwardly opening channel extends about the entire circumferential dimension of said collar.

3. A composite male hose coupler comprising:
   a cylindrical collar having threads formed on at least a portion of the outer surface thereof, the threads terminating at one end of said collar, and an inwardly extending annular shoulder formed at a spaced distance from the one end of said collar; and
   a metallic tail piece including a first cylindrical portion and a second cylindrical portion joined to the first portion by a radially outwardly extending annular flange and the second portion terminating in a radially outwardly extending lip formed to intimately contact said collar to maintain the annular flange in snug engagement with the inwardly extending shoulder of said collar to militate against relative movement between said tail piece and said collar.

\* \* \* \* \*

UNITED STATES PATENT AND TRADEMARK OFFICE
CERTIFICATE OF CORRECTION

PATENT NO. : 6,308,993 B1
DATED : October 30, 2001
INVENTOR(S) : Daniel L. Phillips Page 1 of 1

It is certified that error appears in the above-identified patent and that said Letters Patent is hereby corrected as shown below:

<u>Column 3,</u>
Line 24, change the word "lease" to -- least --.

<u>Column 4,</u>
Line 2, insert the word -- first-- after "the".

Signed and Sealed this

Seventh Day of May 2002

Attest:

Attesting Officer

JAMES E. ROGAN
Director of the United States Patent and Trademark Office